United States Patent Office 3,798,187
Patented Mar. 19, 1974

3,798,187
PHOTO-DEGRADABLE STYRENE TYPE
RESIN COMPOSITIONS
Hiroshi Miyoshi, Takatsuki, Tomoo Shinohara, Kyoto, and Hiroyuki Tateishi, Shiga, Japan, assignors to Sekisui Kagaku Kogyo Kabushiki Kaisha, Osaka, Japan
No Drawing. Filed June 22, 1971, Ser. No. 155,617
Int. Cl. C08f 33/08, 47/10
U.S. Cl. 260—2.5 HB                                       14 Claims

ABSTRACT OF THE DISCLOSURE

Photo-degradable styrene type resin compositions formed by addition of at least one halogenated polystyrene, in which at least a portion of the hydrogen atoms linked with the carbon atoms in the main chain of the polymer are substituted with halogen atoms, in an amount sufficient to exhibit photo-degradation-promoting action, to a styrene type resin.

---

This invention relates to photo-degradable styrene type resin compositions which are readily deteriorated and disintegrated upon exposure to sunlight or ultraviolet rays.

Synthetic resins in general are not appreciably deteriorated by oxidation, ozonization, or by the action of microorganisms under natural circumstances. Thus shaped products of synthetic resins such as containers, bags, foams, etc. retain their shapes for prolonged periods after they are used and discarded, making their disposal very inconvenient. In fact, disposal of such used synthetic resin products is presently a social problem.

For instance the synthetic resin products discarded into rivers, or on fields or roadsides remain there for long time without any deterioration, and cause various industrial problems and spoil the environmental cleanliness. Recovery of those discarded products is very labor- and time-consuming. It is furthermore well known that when the recovered products are burnt in an incinerator, they produce black smoke or toxic gas. Also because they generate extremely high temperatures when burnt, life of the incinerators is markedly shortened.

In consideration of the above circumstances, the object of the present invention is to provide photo-degradable synthetic resins, so that the shaped products made of such resins naturally deteriorate and disintegrate when left outdoors, causing no problems of disposal. It has been found, according to the present invention, that resinous compositions which readily decompose and deteriorate and disintegrate upon exposure to sunlight and ultraviolet rays can be obtained by adding a high molecular weight compound of specific structure to a specific synthetic resin.

The invention provides photo-degradable styrene type resin compositions which are composed of at least one halogenated polystyrene in which at least a part of the hydrogens linked with the carbon atoms in the polymer's main chain are substituted with halogen atoms, and a styrene type resin.

The "styrene type resin" to which the halogenated polystyrene is added according to the present invention includes the thermoplastic synthetic resins of which chief component is styrene. More specifically, the styrene type resins useful for the present invention include homopolymers of styrene; homopolymers of styrene derivatives such as α-methylstyrene, methyl vinyl benzene, ethyl vinyl benzene, α-chlorostyrene, 4-chlorostyrene, 2,4-dichlorostyrene and 2,4,6-trichlorostyrene; copolymers of styrene and styrene derivatives such as styrene-α-methylstyrene copolymer; copolymers of styrene or styrene derivatives with other comonomers which are copolymerizable therewith, for example, acrylic monomers such as methyl acrylate, ethyl acrylate, butyl acrylate, acrylic acid, methyl methacrylate, methacrylic acid, and acrylonitrile; diene monomers such as butadiene and isoprene; maleic acid, itaconic acid, and esters thereof; specific examples including styrene-methyl methacrylate copolymer, styrene-acrylonitrile copolymer, styrene-butadiene copolymer, acrylonitrile-butadiene-styrene copolymer, methyl methacrylate-butadiene-styrene copolymer and, α-methylstyrene-methyl methacrylate copolymer. Those copolymers may contain at most 50% by weight, preferably 30% by weight, inter alia, 0.1–10% by weight, of the comonomers named above.

The styrene resin used in the present invention may have the average degree of polymerization of at least 800. In view of the moldability, etc., the resins preferably have the average degree of polymerization ranging from 800 to 5,000, normally 1,000–2,000.

When a copolymer is employed as the styrene type resin in accordance with the invention, styrene-butadiene copolymers, particularly those of the butadiene content ranging from 0.1–10 wt. percent, can be used with notable effect to promote photo-deterioration of the compositions.

The halogenated polystyrene added to the styrene type resin according to the present invention can be prepared, for example, by the method described in Journal of Applied Polymer Science, vol. 12 (1968), pp. 2059–2066, Robert K. Jenkins et al., "Chlorination of Polystyrene." As the halogen, bromine is particularly preferred because brominated polystyrene markedly contributes to promote deterioration of the subject compositions, while chlorine may also be used. The halogenation ratio of such halogenated polystyrene should preferably be at least 20%, normally from 20 to 100%. Polystyrenes which are halogenated by approximately 50% or more exhibit greater photo-degradation-promoting effect, and therefore, are preferred. The "halogenation ratio" mentioned here means the ratio of number of halogen atoms linked with the carbon atoms in the polymer's main chain per one styrene unit. Thus, for example, "100% halogenation ratio" refers to the case wherein on the average one halogen atom per one styrene unit is linked with a carbon atom in the main chain of the polymer. Likewise, if on the average one-fifth of a halogen atom per one-styrene unit is linked with the carbon atoms, the halogenation ratio is 20%. The degree of polymerization of such halogenated polystyrene is also relevant to a minor extent on the promoting action of photo-degradation of the resulting compositions. Thus, while the halogenated polystyrenes of a degree of polymerization as low as 20 can be used, those having the average degree of polymerization ranging from 30 to 1,500 are advantageously employed. Polystyrenes having a lower degree of polymerization within the above range are particularly preferred for ease of halogenation.

According to the invention, the halogenated polystyrene is added to the styrene type resin, in the amount at least sufficient to make the latter photo-degradable. Normally, at least 0.1 part by weight of the halogenated polystyrene is added per 100 parts by weight of the styrene type resin. With addition of the halogenated polystyrene less than the above, only a minor photo-degradation promoting effect can be expected.

There is no critical upper limit to the addition of halogenated polystyrene. If the halogenation ratio of the polystyrene is low, a large amount of the polymer must be used. Normally, however, 10 parts by weight or less of the halogenated polystyrene is suitably used based upon obtaining adequate physical properties and cost of the resulting compositions. Thus, it is particularly preferred to use 1–5 parts of the halogenated polystyrene per 100 parts of the styrene type resin, the parts being by weight.

The photo-degradable styrene type resin compositions of the present invention can be obtained by adding a suitable amount of the halogenated polystyrene to the styrene type resin, and milling and blending them under elevated temperature, by means of a mixing roll, Bumbury mixer, extrusion mill, etc. The compositions can be molded into the products of suitable shapes, such as plates, sheets, films, containers, etc., by accepted means such as injection molding machine, extruder, pressing machine, roll, etc.

During the molding, a volatile foaming agent such as propane, butane and pentane, or solid foaming agent such as mixture of sodium bicarbonate with citric acid, may be added to the resinous mixture, to form foamed products under heating. Furthermore, it is also possible to first add such foaming agent to the styrene type resin alone, and then to blend the mixture with the halogenated polystyrene, before the shaping operation. In any of these cases, the amount of the foaming agent added is preferably 1 to 10 parts by weight based on 100 parts by weight of the resinous mixture.

The photo-degradable styrene type resin compositions of the present invention may contain, as the occasion demands, conventionally employed heat stabilizers, lubricants, fillers, pigments, etc. As already mentioned, the compositions may also contain the foaming agent, so as to form foamable compositions.

The photo-degradable styrene type resin compositions possess substantially equal strength with that of conventional compositions made of the styrene type resin alone, and average degree of polymerization of for example, 800–5,000, and exhibit performance similar to those of conventional shaped products, before subjected to the action of sunlight and ultraviolet rays. However, when they are discarded and exposed to sunlight and ultraviolet rays, they readily deteriorate and disintegrate, their average degree of polymerization being reduced to approximately 500 or less. They become so fragile that they are reduced to powder when pinched lightly with fingers.

The reason why the photo-degradable styrene type resin compositions of the invention easily deteriorate and disintegrate upon exposure to sunlight and ultraviolet rays is not yet clear. Presumably, however, the halogenated polystyrene in the compositions causes radical dissociation under the action of ultraviolet rays, and consequently the released radicals form peroxides which attack the styrene type resin in the compositions to break the polymer's main chain and oxidize the polymer. Under such actions, deterioration of the compositions is likely promoted and advanced to the point of decomposition.

The photo-degradable styrene type resin compositions of the invention are readily deteriorated and degraded by sunlight and ultraviolet rays to decompose into powder, because the halogenated polystyrene, in which a part or all of the hydrogens bonded with carbon atoms in the polymer's main chain are substituted with halogen atoms and which is highly susceptible to the action of ultraviolet rays, is added to the styrene type resin. When the compositions are used as shaped synthetic resin products to be discarded after a single use, they deteriorate and are reduced to powder within approximately a few weeks, in natural environments. Thus they cause no problem to the appearance and cleanliness of natural environments, nor require such troubles as recovery and incineration. If recovered, they can be easily reduced to powder by exposure to sunlight or irradiation with ultraviolet rays. Thus the disposal of used containers and other shaped products of synthetic resins which is now a social problem is very satisfactorily solved.

Again, when resinous compositions containing chemical additives are used in such fields as food containers, occasionally the toxicity of such chemical additives leaching out to the surfaces of the products is a problem. When the photo-degradable styrene type resin compositions of the present invention are used in that field, such leaching does not take place because the halogenated polystyrene employed as the additive is a high molecular compound highly compatible with the styrene type resin. The compositions furthermore produce no noxious odor during molding, and thus can be used quite satisfactorily in food industries.

Hereinafter the invention will be explained with reference to working examples.

EXAMPLE 1

11.2 grams of polystyrene of an average degree of polymerization of 30 were dissolved in 150 ml. of carbon tetrachloride, and 22 g. of N-bromosuccinic acid imide and 5.5 g. of benzoyl peroxide were added, followed by 5 hours reaction under reflux. The reaction liquid was washed with 3% aqueous sodium carbonate, then with water, and reprecipitated from methanol. The bromination ratio of the refined brominated polystyrene obtained was 68%. This brominated polystyrene was labeled as sample (I).

The above procedures were repeated except that a polystyrene of 1,300 in average degree of polymerization was used as the starting material. The brominated polystyrene obtained had a bromination ratio of 55%, which was labeled as sample (II).

Then 0.01 g. and 0.05 g. of the above samples (I) and (II) were separately added into a solution of 1 g. of polystyrene having an average degree of polymerization of 1,300 in 10 ml. of toluene, and dispersed homogeneously. The four samples prepared in the above manner were each spread onto the surfaces of mercury in a pan, and made into a film of 0.2 mm. in thickness, by evaporating the solvent off at 50–60° C. The films were subjected to the irradiation of predetermined dosage of ultraviolet rays, and the corresponding variation in their degree of polymerization was measured to determine the extent of their deterioration. The results were as given in Table 1. The ultraviolet rays irradiation was effected with a 400 W high pressure mercury lamp (Toshiba High Pressure Mercury Lamp H–400F, Tokyo Shibaura Denki Kabushiki Kaisha), spaced from the sample by 30 cm.

For comparison, polystyrene of an average degree of polymerization of 1,300 containing no halogenated polystyrene was similarly made into a film, and irradiated with ultraviolet rays in an identical manner. The result is also given in the same table.

EXAMPLE 2

26 grams of polystyrene of an average degree of polymerization of 30 were dissolved in 250 ml. of carbon tetrachloride, and 20 g. of bromine were added in an ordinary glass flask under reflux and stirring. The addition was performed while the flask was externally irradiated with a high pressure mercury lamp, consuming approximately an hour. The reaction was continued for approximately 20 hours, and thereafter the system was cooled, followed by cleaning, aqueous washing and refining similar to the procedures in Example 1. The brominated polystyrene obtained had a bromination ratio of 51%, which was labeled as sample (III).

Similarly another brominated polystyrene having a bromination ratio of 48% was obtained from polystyrene of an average degree of polymerization of 500, which was labeled as sample (IV).

The samples were similarly added to polystyrene of an average degree of polymerization of 1,300 as described in Example 1, and made into films. The films were subjected to ultraviolet rays irradiation in a manner similar to Example 1, and their corresponding variations in degree of polymerization were measured. The results were also as given in Table 1.

EXAMPLE 3

10.4 grams of polstrene of an average degree of polymerization of 1,030 were dissolved in 50 ml. of carbon tetrachloride, and through the solution, chlorine gas was passed at 10° C. under irradiation with a high pressure mercury lamp. The samples were withdrawn from the system after 20 hours, 35 hours, and 50 hours, of the reaction, and were cleaned, washed with water, and refined in a manner similar to Example 1, to provide three chlorinated polystyrenes having chlorination ratios of, respectively, 52%, 71%, and 92%, which were labeled, respectively, as samples (V), (VI), and (VII).

Each sample was added to polystyrene of an average degree of polymerization of 1,300 and shaped into a film in a manner similar to Example 1, and subjected to ultraviolet rays irradiation again in a manner similar to Example 1. The corresponding variations in degree of polymerizations of the films were measured, with the results as shown in Table 1.

EXAMPLE 4

4.0 kilograms of foamable polystyrene particles of average degree of polymerization of 1,300, containing 5 wt. percent of propane, were mixed with 200 g. of the brominated polystyrene obtained through the procedures similar to Example 2 (bromination ratio, 51%, sample (III)), and 100 g. of talc. The mixture was extruded into sheet form through an extruder at 170° C. The foamed sheet had a density of 0.085 g./cc. and a thickness of 1.5 mm.

The foamed sheet was subjected to ultraviolet rays irradiation in a manner similar to Example 1, and the corresponding variation in degree of polymerization was measured, with the results as given in Table 1.

EXAMPLE 5

0.05 gram of the brominated polystyrene (bromination ratio, 51%) obtained in the manner similar to Example 2 was added to 1 g. of a styrene-butadiene copolymer having an average degree of polymerization of 1,300, and containing 7 wt. percent of butadiene. The composition was formed into 0.2 mm.-thick film in a manner similar to Example 1, and the film was subjected to the ultraviolet rays irradiation. The corresponding variation in degree of polymerization was measured with the results as given in Table 1.

tions composed of the styrene type resin alone, when not irradiated with ultraviolet rays, but when irradiated, the former exhibit reduction in degree of polymerization at a far greater rate than that in the latter. Thus it can be understood that the addition of specified halogenated polystyrene has a very remarkable photo-degradation-promoting effect.

The films obtained in the foregoing examples were also left in the outdoors, instead of the exposure to ultraviolet rays irradiation as above. In that series of tests, the films were fixed on a plate placed at an angle of 45° with the earth, facing the south. Approximately after two weeks of the outdoor exposure, a reduction in the degree of polymerization equalling with that after 100 hours ultraviolet rays irradiation was observed in the films of this invention. The films were so heavily deteriorated that they were readily reduced to a powder when lightly pinched with finger tips. When the exposure was further continued, the films were decomposed by rain and wind, and completely vanished.

What is claimed is:

1. A photo-degradable resin composition prepared by blending (a) at least one halogenated polystyrene having a halogenation ratio of at least 20% in which at least a portion of the hydrogen atoms linked with the carbon atoms in the main chain of the polymer are substituted with halogen atoms, and (b) a resin selected from the group consisting of: homopolymers of styrene; homopolymers of styrene derivatives selected from α-methylstyrene, methylvinyl benzene, ethylvinyl benzene, α-chlorostyrene, 4-chlorostyrene, 2,4-dichlorostyrene, and 2,4,6-trichlorostyrene; copolymers of styrene and said styrene derivatives; and copolymers of styrene or said styrene derivatives with a monomer copolymerizable therewith, said copolymers containing at least 50% by weight styrene or said styrene derivatives; said halogenated polystyrene (a) being present in the amount of 0.1 to 10 parts by weight per 100 parts by weight of resin (b).

2. The composition of claim 1 wherein said halogenated polystyrene is brominated polystyrene.

3. The composition of claim 1 wherein said halogenated polystyrene is chlorinated polystyrene.

4. The composition of claim 1 wherein the average degree of polymerization of said halogenated polystyrene is at least 20.

TABLE 1

| | Type of halogenated polystyrene | Halogenation ratio (percent) | Amount of halogenated polystyrene[1] | Variation in degree of polymerization of film vs. ultraviolet rays irradiation time | | |
|---|---|---|---|---|---|---|
| | | | | 0 (Un-irradiated) | 20 hours | 100 hours |
| Example number: | | | | | | |
| 1 | (I) | 68 | 1 | 1,290 | 800 | 500 |
| | (I) | 68 | 5 | 1,250 | 540 | 260 |
| | (II) | 55 | 1 | 1,300 | 780 | 570 |
| | (II) | 55 | 5 | 1,300 | 530 | 380 |
| 2 | (III) | 51 | 1 | 1,290 | 680 | 440 |
| | (III) | 51 | 5 | 1,250 | 420 | 400 |
| | (IV) | 48 | 1 | 1,290 | 650 | 500 |
| | (IV) | 48 | 5 | 1,260 | 470 | 410 |
| 3 | (V) | 52 | 1 | 1,300 | 930 | 650 |
| | (V) | 52 | 5 | 1,260 | 800 | 460 |
| | (VI) | 71 | 1 | 1,300 | 870 | 600 |
| | (VI) | 71 | 5 | 1,260 | 690 | 520 |
| | (VII) | 92 | 1 | 1,300 | 700 | 430 |
| | (VII) | 92 | 5 | 1,260 | 620 | 360 |
| 4 | (III) | 51 | 5 | 1,230 | 400 | 370 |
| 5 | (III) | 51 | 5 | 1,250 | 410 | 250 |
| Control | | | 0 | 1,300 | 1,060 | 980 |

[1] Wt. part per 100 wt. parts of styrene type resin.

The results in Table 1 clearly demonstrate that the styrene type resin compositions of the present invention formed by adding halogenated polystyrene in which at least a part of the hydrogens linked with the carbon atoms in the polymer's main chain are substituted with halogen atoms to styrene type resin show substantially the same degree of polymerization as those of resinous composi- 5. The composition of claim 1 wherein the resin in group (b) is a homopolymer of styrene.

6. The composition of claim 1 wherein the resin of group (b) is a styrene-butadiene copolymer.

7. The composition of claim 1 wherein the average degree of polymerization of the resin of group (b) is at least 800.

8. The composition of claim 1 wherein the average degree of polymerization is 800–5000.

9. The composition of claim 1 in which a foaming agent is present.

10. The composition of claim 1 wherein said resin composition is a foam.

11. The composition of claim 1 wherein said resin composition is a sheet.

12. The composition of claim 1 wherein said resin composition is a container.

13. The composition of claim 1 wherein the halogenation ratio of said halogenated polystyrene is at least 50%.

14. The composition of claim 1 wherein 1 to 5 parts by weight of said halogenated polystyrene of group (a) are present per 100 parts by weight of said resin of group (b).

References Cited
UNITED STATES PATENTS 3,009,906  11/1961  Eichhorn et al. ____ 260—93.5 A
3,063,954  11/1962  Galizia _____ 260—2.5 P WILBERT J. BRIGG, Sr., Primary Examiner U.S. Cl. X.R.

260—2.5 H, 890, 899; 204—159.2; 260—892, Dig. 43